Patented Dec. 21, 1937

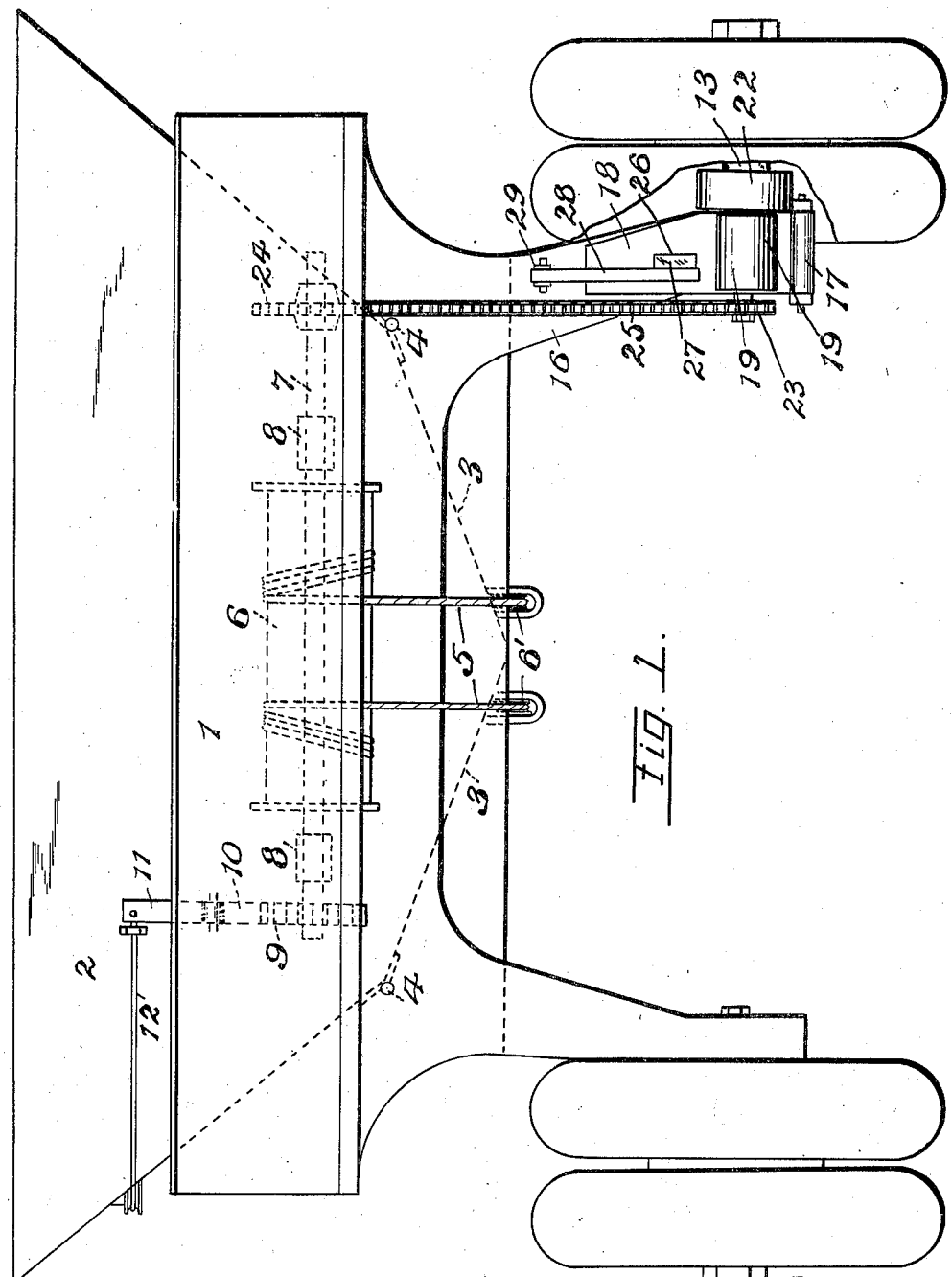

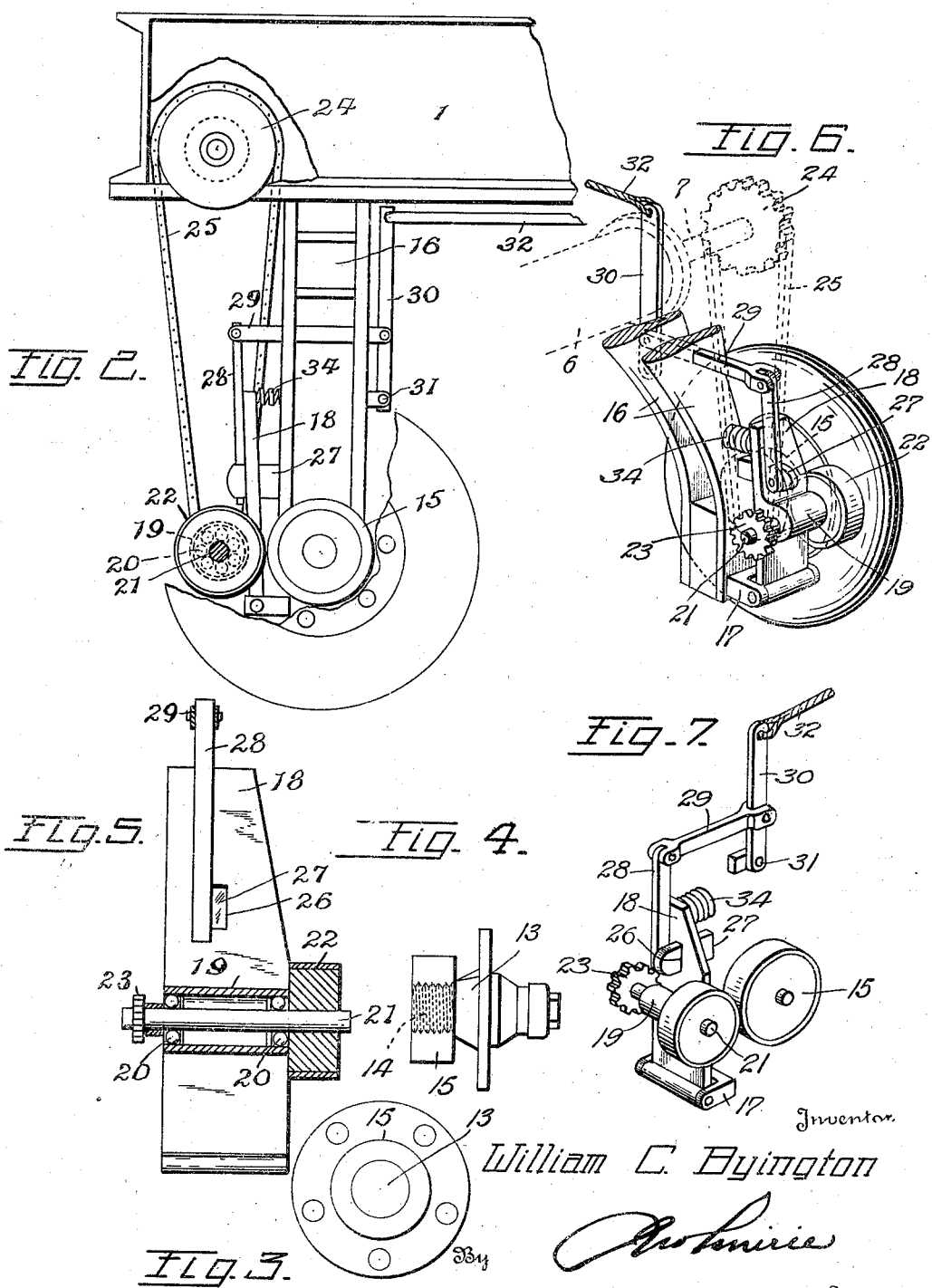

2,102,676

UNITED STATES PATENT OFFICE 2,102,676

DUMP WAGON

William C. Byington, Nacogdoches, Tex., assignor to All Steel Trailer Company, Nacogdoches, Tex.

Application March 17, 1937, Serial No. 131,447

3 Claims. (Cl. 298—35)

This invention is directed to an improvement in dump wagons or trailers of the type provided with bottom dumping doors, and is more particularly concerned with means whereby the dumping doors, after having been opened by the weight of the load for discharge purposes, are automatically brought through and incident to the movement of the vehicle, to a closed or load-receiving position.

The primary object of the present invention is the provision of means, including a friction couple, for operating the cable drums for causing the cables to move the doors to a closed or load-receiving position, the friction couple including an element secured to the hub of a ground wheel, and a cooperating element manually movable into and out of friction driving relation with the hub-carried element.

A further object of the invention is the provision of means whereby the manually controlled friction element is rigidly mounted to insure maximum friction effect without loss incident to play of parts; with such manually controlled friction element automatically movable to a friction release or inoperative position under all conditions and at all times when closing movement of the dump doors is not required.

The invention is illustrated in the accompanying drawings, in which:

Figure 1 is a view in rear elevation of a dump wagon or trailer with the improved operating means applied thereto.

Figure 2 is a side view of the same, parts being broken away.

Figure 3 is an end elevation, partly in section, showing the application of the hub-carried friction element to the hub.

Figure 4 is an inner elevation of the same.

Figure 5 is a rear elevation, partly in section, of the manually controlled friction element and the mounting therefor.

Figure 6 is a detail perspective view of the door operating mechanism.

Figure 7 is a detail view illustrating particularly the friction elements and the operating connections.

The improved trailer or dump wagon may, aside from the details noted, be of any conventional construction, being here shown as a rectangular body 1 having a hopper-like upper portion 2 to the bottom of which is hinged doors 3 which, through their hinged supports at 4, permit gravital movement of the doors to discharge the load. The doors are held in closed position by cables 5 which extend lengthwise and beneath the doors, preferably passing over pulleys 6, with their forward terminals connected to a fixed part at the front of the body to permit the cables to have a full length supporting function on the doors.

The opposite ends of the cables 5 are wound over a drum 6 fixed to a shaft 7 supported in bearings 8 secured to the rear bottom ledge of the body inwardly of the rear fixed end thereof. On one end of the shaft is arranged a ratchet wheel 9 with which a pawl 10 cooperates to prevent that movement of the ratchet which would permit unwinding of the cables 5 and a dumping movement of the doors. The pawl 10 is controlled by a lever 11 connected to a flexible cable or the like 12 leading within reach of the driver or operator, whereby the pawl may be tripped, the ratchet released and the doors, under the weight of the load, permitted to swing downwardly for complete discharge of the load.

It is highly desirable and particularly important from the standpoint of economy in operation that the doors be moved to closed position after load discharge by and through the movement of the vehicle without necessitating interruption in the travel of the vehicle or that the attendant or driver leave his place on the vehicle to close the doors. With this arrangement, the loaded vehicle may be caused to dump its load and close the doors for the reception of a fresh load without interrupting the progress of the vehicle in the slightest particular, thereby effecting a material saving in time and thus an economy in operation.

The present invention is more particularly concerned with the means for returning the doors to closed position incident to and during the movement of the vehicle. For this purpose, the hub of the rear ground wheels, whether of the single or double tire type, which hub is indicated at 13, is threaded at its inner end, as at 14, to receive through such threaded connection a friction element, preferably in the form of a sleeve of bronze or fiber, such element being shown at 15 in Figures 3 and 4.

The rear leg 16 of the dump wagon in which the stub axles for carrying the wheels are supported, is provided at its lower end with a rearwardly extending block-like element 17 rigidly secured in place. Pivotally secured to and rising from this block-like element is a supporting plate 18 which is of considerable width in a plane parallel to the axle of the wheel. As the block 17 is secured to the leg of the frame, such block and consequently the plate 18 rising therefrom will be offset from longitudinal alignment with the friction element 15. Welded or otherwise rigidly secured to the plate 18 and preferably of the full width of the plate is a sleeve-like element 19 within which is arranged a series of roller bearings 20, or other suitable anti-friction supports, for rotatably supporting a shaft 21, on one end of which, in alignment with the friction element 15, is secured a steel friction wheel 22. The opposite end of the shaft 21 is provided with a sprocket wheel 23 connected to a sprocket wheel 24 on the end of the shaft 7 by a chain 25.

Above the sleeve 19, the plate 18 is formed with an opening 26 to snugly receive a projection 27 fixed to the leg 16 of the trailer or dump wagon. Through this cooperation, the movement of the plate 18 is guided and any canting or twisting of the plate under the driving friction is avoided. A bar 28 is connected to the upper end of the plate 18, which bar, through a link 29, is connected to a lever 30 pivoted at 31 on the leg 16. The upper end of the lever 30 is connected by a cable or like means 32 to a convenient operating lever (not shown) within reach of the driver. A spring 34 is interposed between the upper end of the plate 18 and the leg 16 and serves to move the plate in a direction to separate the friction elements.

Assuming the load dumped and the doors in open position, the driver by a pull on the cable 33 moves the plate 18 and thereby the movable friction element 22 into frictional contact with the hub-carried frictional element 15. Travel of the vehicle will therefore operate the drum 6 in a direction to draw upon the cables 5 and move the doors to closed position. The pawl 10 over-runs the ratchet during this movement and as the doors reach closed position, the pawl engages the ratchet to hold the doors against opening movement until such pawl shall have been operated to release the doors, as previously described.

The construction provides a simple means which may be conveniently applied to any and all dump wagons or trailers to insuring of closing the doors after dumping the load in a completely automatic operation and without interrupting the movement of the vehicle. Of course, the friction members may be constructed of any appropriate material necessary to insure a substantially non-slipping frictional cooperation sufficient to move the doors to closed position.

What is claimed to be new is:

1. A dump vehicle, comprising a body having wheel supporting legs, ground wheels mounted on the legs, a friction element carried by one of the ground wheels, load discharging doors hinged to the bottom of the body, cables for moving the doors to closed position, a plate pivotally supported to one of the legs, a friction element mounted on the plate, means for moving the plate to cause the friction element mounted thereon to engage the friction element carried by the ground wheel, means intermediate the friction element mounted on the plate and the doors to operate the cables and move the doors to closed position by the movement of the friction elements, a guide extending from one of the legs and through the plate, and a spring between the plate and leg to normally separate the friction elements.

2. A dump vehicle, comprising a body having wheel supporting legs, ground wheels mounted on the legs, a friction element carried by one of the ground wheels, load discharging doors hinged to the bottom of the body, cables for moving the doors to closed position, a plate pivotally supported at its lower end to one of the legs, a friction element mounted on the pivoted plate near the lower end thereof, a link pivotally connected at one end to the upper end of the plate and extending through the leg, a vertically disposed lever pivoted to the leg, a pivot connecting the link and lever to provide means for moving the plate to cause the friction element mounted thereon to engage the friction element carried by the ground wheel, a drum mounted on the body to receive the cables, means between the friction element mounted on the plate and the drum to rotate the latter and wind the cables and move the doors to closed position in the movement of the friction element.

3. A dump vehicle, comprising a body having wheel supporting legs, ground wheels mounted on the legs, a friction element carried by one of the ground wheels, load discharging doors hinged to the bottom of the body, cables for moving the doors to closed position, a plate pivotally supported at its lower end to one of the legs, a friction element mounted on the pivoted plate near the lower end thereof, a link pivotally connected at one end to the upper end of the plate and extending through the leg, a vertically disposed lever pivoted to the leg, a pivot connecting the link and lever to provide means for moving the plate to cause the friction element mounted thereon to engage the friction element carried by the ground wheel, a spring interposed between the plate and leg to normally separate the friction elements, a fixed lug extending from the leg and through an opening formed in the plate to guide the latter in its movement, a drum mounted on the body to receive the cables, a sprocket wheel on the drum, a sprocket wheel carried by the friction element mounted on the plate, and a sprocket chain extending around the two sprocket wheels to rotate the drum and wind the cables and move the doors to closed position in the movement of the friction element.

WILLIAM C. BYINGTON.